US012783643B2

(12) United States Patent
Levy et al.

(10) Patent No.: US 12,783,643 B2
(45) Date of Patent: Nov. 3, 2026

(54) CONTROLLED ACCESS OF DPU RESOURCES

(71) Applicant: MELLANOX TECHNOLOGIES, LTD., Yokneam (IL)

(72) Inventors: Itai Levy, Haifa (IL); Shachar Dor, Rosh Haayin (IL); Parav Kanaiyalal Pandit, Atlanta, GA (US); Liel Shoshan, Caesarea (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 551 days.

(21) Appl. No.: 17/972,898

(22) Filed: Oct. 25, 2022

(65) Prior Publication Data

US 2024/0134970 A1 Apr. 25, 2024
US 2024/0232336 A9 Jul. 11, 2024

(51) Int. Cl.
*G06F 21/55* (2013.01)
*G06F 21/62* (2013.01)

(52) U.S. Cl.
CPC ........ *G06F 21/552* (2013.01); *G06F 21/6218* (2013.01); *G06F 2221/034* (2013.01)

(58) Field of Classification Search
CPC ............... G06F 21/552; G06F 21/6218; G06F 2221/034
See application file for complete search history.

(56) References Cited

U.S. PATENT DOCUMENTS 9,825,830 B2 * 11/2017 Zalmanovitch ......... H04L 43/04
9,922,696 B1 * 3/2018 Li ....................... G11C 11/4091
10,162,684 B2 * 12/2018 Feng ..................... G06F 9/5083
10,554,751 B2 * 2/2020 Vedula ................ H04L 41/0896
11,625,273 B1 * 4/2023 Elhemali ............... G06F 16/217 718/104
12,067,421 B2 * 8/2024 Kwon ................. G06F 11/3471
12,244,601 B2 * 3/2025 Tarkhanyan .......... H04L 63/123
2012/0271936 A1 * 10/2012 Burch ................. H04L 63/1408 709/224
2016/0197841 A1 * 7/2016 Xu .......................... H04L 67/60 709/226

(Continued)

OTHER PUBLICATIONS

"Add support to virtio-vDPA devices #2664," GitHub, Inc., 2021, 7 pages [retrieved online Feb. 21, 2023 from: github.com/ovn-org/ovn-kubernetes/pull/2664].

(Continued)

*Primary Examiner* — Michael W Chao
(74) *Attorney, Agent, or Firm* — Sheridan Ross P.C.

(57) ABSTRACT

A system includes a data processing unit (DPU) and DPU resource management circuits. A DPU resource management circuit establishes an interface associated with managing resources of the DPU, where establishing the interface is based on another DPU resource management circuit of the system accessing the DPU. The DPU resource management circuit monitors usage of the resources of the DPU based on auditing data provided by the second DPU resource management circuit. In some cases, the DPU resource management circuit may allocate resources of the DPU to an application. The DPU resource management circuit generates a catalog data structure of the resources of the DPU. The catalog data structure includes entries corresponding to resources of the DPU and functions provided by the resources.

20 Claims, 5 Drawing Sheets

(56) References Cited

U.S. PATENT DOCUMENTS

| | | | | |
|---|---|---|---|---|
| 2019/0013965 | A1* | 1/2019 | Sindhu | H04L 49/10 |
| 2020/0314012 | A1* | 10/2020 | Goel | H04W 84/18 |
| 2021/0097082 | A1* | 4/2021 | Billa | G06F 16/9024 |
| 2021/0211427 | A1* | 7/2021 | Wang | H04M 15/83 |
| 2021/0232331 | A1* | 7/2021 | Kannan | G06N 20/00 |
| 2021/0314232 | A1* | 10/2021 | Nainar | H04L 45/64 |
| 2021/0357302 | A1* | 11/2021 | Hoffnung | G06F 11/3428 |
| 2022/0231964 | A1* | 7/2022 | Alam | H04L 47/74 |
| 2022/0329522 | A1* | 10/2022 | Maciocco | H04L 41/16 |
| 2023/0065444 | A1* | 3/2023 | Pyla | G06F 9/5016 |
| 2023/0091753 | A1* | 3/2023 | Kelly | G06F 9/485 718/104 |
| 2023/0106581 | A1* | 4/2023 | Sood | H04L 63/166 709/203 |
| 2023/0122315 | A1* | 4/2023 | Wang | G06F 3/0644 711/154 |
| 2023/0168929 | A1* | 6/2023 | Wadekar | G06F 9/5005 718/104 |
| 2023/0199077 | A1* | 6/2023 | Poornachandran | H04L 67/104 709/223 |
| 2023/0224261 | A1* | 7/2023 | Pope | G06F 13/4022 370/392 |
| 2023/0289453 | A1* | 9/2023 | Hendrickson | G06F 13/1673 |
| 2024/0004722 | A1* | 1/2024 | Farley | G06F 9/5072 |
| 2024/0022605 | A1* | 1/2024 | Farley | H04L 47/80 |
| 2024/0069722 | A1* | 2/2024 | Bahirat | G06F 3/0655 |
| 2024/0134998 | A1* | 4/2024 | Madala | G06F 9/45558 |
| 2025/0173177 | A1* | 5/2025 | Baransi | G06F 9/45558 |

OTHER PUBLICATIONS

"Open vSwitch," Wikipedia, last edited Apr. 28, 2022, 4 pages [retrieved online Feb. 21, 2023 from: en.wikipedia.org/wiki/Open_vSwitch].

"Physical Functions (PFs)," Rambus, 1 page [retrieved online Feb. 21, 2023 from: www.plda.com/pcie-glossary/physical-functions-pfs].

* cited by examiner

174

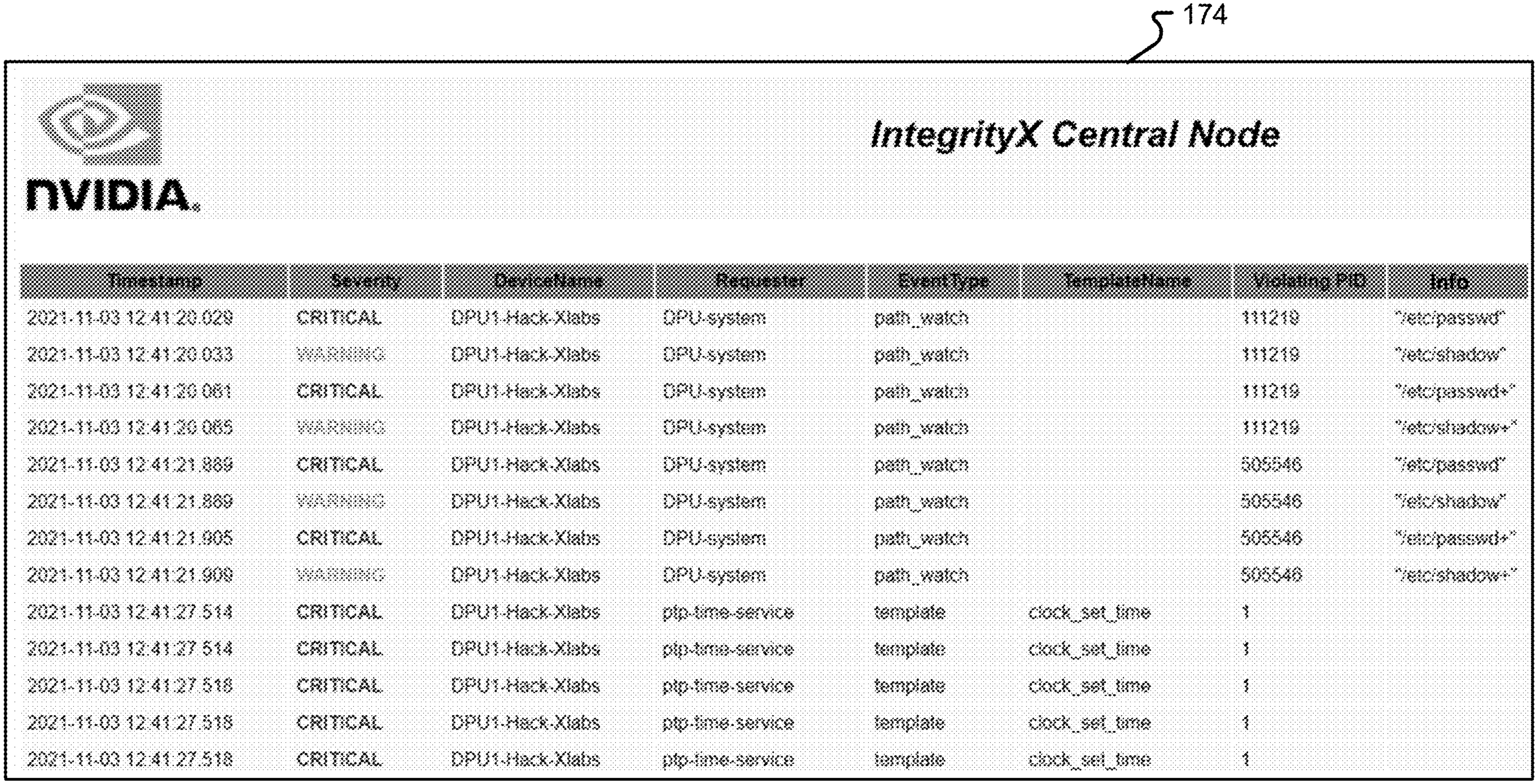
NVIDIA.

IntegrityX Central Node

| Timestamp | Severity | DeviceName | Requester | EventType | TemplateName | Violating PID | Info |
|---|---|---|---|---|---|---|---|
| 2021-11-03 12:41:20.029 | CRITICAL | DPU1-Hack-Xlabs | DPU-system | path_watch | | 111219 | "/etc/passwd" |
| 2021-11-03 12:41:20.033 | WARNING | DPU1-Hack-Xlabs | DPU-system | path_watch | | 111219 | "/etc/shadow" |
| 2021-11-03 12:41:20.061 | CRITICAL | DPU1-Hack-Xlabs | DPU-system | path_watch | | 111219 | "/etc/passwd+" |
| 2021-11-03 12:41:20.065 | WARNING | DPU1-Hack-Xlabs | DPU-system | path_watch | | 111219 | "/etc/shadow+" |
| 2021-11-03 12:41:21.889 | CRITICAL | DPU1-Hack-Xlabs | DPU-system | path_watch | | 505546 | "/etc/passwd" |
| 2021-11-03 12:41:21.889 | WARNING | DPU1-Hack-Xlabs | DPU-system | path_watch | | 505546 | "/etc/shadow" |
| 2021-11-03 12:41:21.905 | CRITICAL | DPU1-Hack-Xlabs | DPU-system | path_watch | | 505546 | "/etc/passwd+" |
| 2021-11-03 12:41:21.909 | WARNING | DPU1-Hack-Xlabs | DPU-system | path_watch | | 505546 | "/etc/shadow+" |
| 2021-11-03 12:41:27.514 | CRITICAL | DPU1-Hack-Xlabs | ptp-time-service | template | clock_set_time | 1 | |
| 2021-11-03 12:41:27.514 | CRITICAL | DPU1-Hack-Xlabs | ptp-time-service | template | clock_set_time | 1 | |
| 2021-11-03 12:41:27.518 | CRITICAL | DPU1-Hack-Xlabs | ptp-time-service | template | clock_set_time | 1 | |
| 2021-11-03 12:41:27.518 | CRITICAL | DPU1-Hack-Xlabs | ptp-time-service | template | clock_set_time | 1 | |
| 2021-11-03 12:41:27.518 | CRITICAL | DPU1-Hack-Xlabs | ptp-time-service | template | clock_set_time | 1 | |

102

Fig. 1C

CONTROLLED ACCESS OF DPU RESOURCES

FIELD OF TECHNOLOGY

The present disclosure relates to data processing units (DPU)s, and more particularly, to techniques for mapping, allocating, and managing DPU resources for consumption.

BACKGROUND

Some systems may support the use of resources of a server hardware by various services, containers, and virtual machines running on the server CPU. Improved techniques for using and managing access to shared resources are desired.

SUMMARY

The described techniques relate to improved methods, systems, devices, and apparatuses that support DPU core service and resource consumption in an abstracted and controlled manner that allows discovery and reporting of unauthorized access to the DPU operating system (OS) and applications. In some aspects, the described techniques relate to improved methods, systems, devices, and apparatuses that support definition, consumption, and controlled access of DPU resources and services. In some aspects, the described techniques support resource allocation, resource assignment, and resource isolation to DPU core services.

Example aspects of the present disclosure include:

A system is including: a Data Processing Unit (DPU) including one or more circuits that route packets within a communications network; and a first DPU resource management circuit including: a processor; memory in electronic communication with the processor; and instructions stored in the memory, the instructions being executable by the processor to: establish an interface associated with managing resources of the DPU, wherein establishing the interface is based on a second DPU resource management circuit of the system accessing the DPU; and monitor usage of the resources of the DPU based on auditing data provided by the second DPU resource management circuit.

Any of the aspects herein, wherein the instructions are further executable by the processor to: generate a catalog data structure of the resources of the DPU, wherein the catalog data structure includes a set of entries, and each entry in the set of the entries corresponds to at least one of: respective resources of the DPU; and one or more functions provided by the respective resources of the DPU.

Any of the aspects herein, wherein: the catalog data structure includes one or more templates; and each of the one or more templates corresponds to one or more resources of the DPU and one or more functionalities of the DPU.

Any of the aspects herein, wherein the first DPU resource management circuit monitors usage of the resources of the DPU by: detecting usage of one or more resources of the DPU by an application; and determining whether the application has ownership of the one or more resources of the DPU.

Any of the aspects herein, wherein the first DPU resource management circuit monitors the usage of the resources of the DPU by: generating reporting data in response to determining, from the auditing data, the application does not have the ownership of the one or more resources of the DPU, wherein the reporting data indicates a violation associated with the usage of the one or more resources of the DPU by the application.

Any of the aspects herein, wherein the first DPU resource management circuit controls usage of the resources of the DPU by: intercepting the usage of the one or more resources of the DPU by the application, in response to determining the application does not have the ownership of the one or more resources of the DPU.

Any of the aspects herein, wherein the second DPU resource management circuit accesses a catalog data structure of the resources of the DPU and controls access to the resources by: receiving, at the second DPU resource management circuit, a request for the resources of the DPU; and allocating the resources of the DPU to the application in response to verifying the request.

Any of the aspects herein, wherein allocating the resources to the application includes allowing the application to at least one of: consume a first portion of the resources of the DPU; and program one or more functions associated with a second portion of the resources of the DPU using the first portion of the resources of the DPU.

Any of the aspects herein, wherein the request includes data indicating: runtime information associated with the resources of the DPU; and one or more attributes of the resources of the DPU.

Any of the aspects herein, wherein: the runtime information includes: an indication of ownership, by the application, of the resources of the DPU; and an operational state associated with the application and the resources of the DPU; and the one or more attributes include one or more functions provided by the resources of the DPU.

Any of the aspects herein, wherein: the system includes an orchestration platform associated with one or more applications; and the one or more applications include one or more containerized applications.

Any of the aspects herein, wherein the resources of the DPU are consumable by at least one of: one or more applications executable on the DPU; and one or more applications executable on a server.

Any of the aspects herein, wherein at least one of the first DPU resource management circuit and the second DPU resource management circuit are external to the DPU.

An apparatus including one or more circuits, wherein the one or more circuits are to: establish an interface associated with managing resources of a DPU, wherein establishing the interface is based on a DPU resource management circuit of the system accessing the DPU; and monitor usage of the resources of the DPU based on auditing data provided by the DPU resource management circuit.

Any of the aspects herein, wherein the one or more circuits are to generate a catalog data structure of the resources of the DPU, wherein the catalog data structure includes a set of entries, and each entry in the set of the entries corresponds to at least one of: respective resources of the DPU; and one or more functions provided by the respective resources of the DPU.

Any of the aspects herein, wherein: the catalog data structure includes one or more templates; and each of the one or more templates corresponds to one or more resources of the DPU and one or more functionalities of the DPU.

Any of the aspects herein, wherein the one or more circuits are to monitor usage of the resources of the DPU by: detecting usage of one or more resources of the DPU by an application; and determining whether the application has ownership of the one or more resources of the DPU.

Any of the aspects herein, wherein the one or more circuits are to monitor the usage of the resources of the DPU by: generating reporting data in response to determining, from the auditing data, the application does not have the ownership of the one or more resources of the DPU, wherein the reporting data indicates a violation associated with the usage of the one or more resources of the DPU by the application.

Any of the aspects herein, wherein the one or more circuits are to control usage of the resources of the DPU by: intercepting the usage of the one or more resources of the DPU by the application, in response to determining the application does not have the ownership of the one or more resources of the DPU.

A DPU including: one or more circuits that route packets within a communications network; and resources that are allocatable to one or more applications based on an ownership of the resources by the one or more applications, wherein: a first portion of the resources performs one or more functions based on programming by the one or more applications; and the first portion of the resources is programmable by the one or more applications using a second portion of the resources.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/implementations in combination with any one or more other aspects/features/implementations.

Use of any one or more of the aspects or features as disclosed herein.

It is to be appreciated that any feature described herein can be claimed in combination with any other feature(s) as described herein, regardless of whether the features come from the same described implementation.

The details of one or more aspects of the disclosure are set forth in the accompanying drawings and the description below. Other features, objects, and advantages of the techniques described in this disclosure will be apparent from the description and drawings, and from the claims.

The preceding is a simplified summary of the disclosure to provide an understanding of some aspects of the disclosure. This summary is neither an extensive nor exhaustive overview of the disclosure and its various aspects, implementations, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, implementations, and configurations of the disclosure are possible utilizing, alone or in combination, one or more of the features set forth above or described in detail below.

Numerous additional features and advantages of the present disclosure will become apparent to those skilled in the art upon consideration of the implementation descriptions provided hereinbelow.

BRIEF DESCRIPTION OF THE DRAWINGS

FIG. 1C illustrates an example of a violation report in accordance with aspects of the present disclosure.

DETAILED DESCRIPTION

Figure 1A:
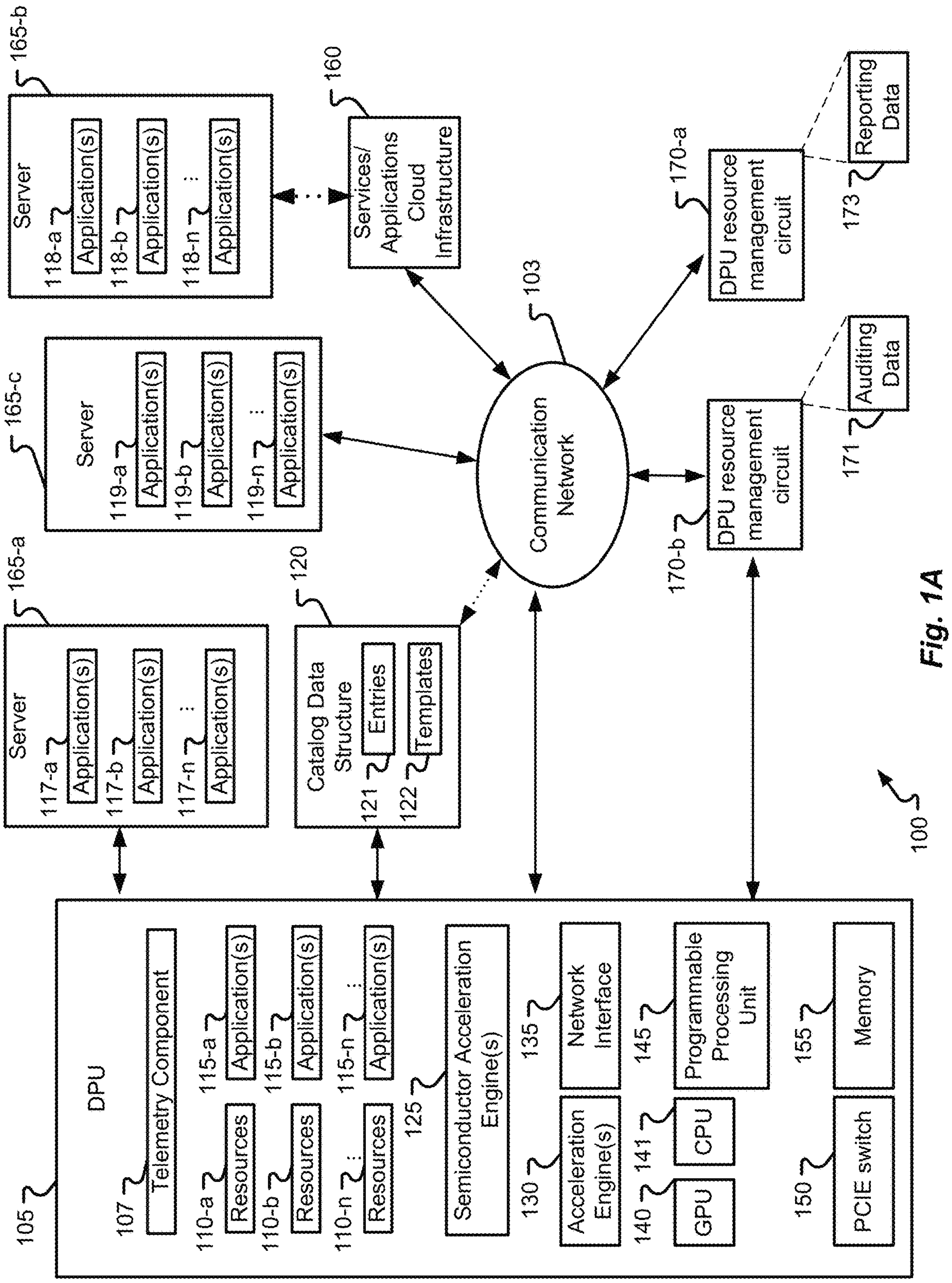
FIGS. 1A and 1B illustrate examples of a system in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Some systems may support the use of resources of a server hardware by various applications, services, containers, and virtual machines running on the server CPU. Improved techniques for using and managing access to a unique DPU resources and capabilities by applications running on the DPU or on the server CPU are desired.

A DPU is a programmable specialized electronic circuit with hardware acceleration of data processing for data-centric computing. A DPU may include a high-performance and software-programmable multi-core central processing unit (CPU), a high-performance network interface (e.g., a network interface card (NIC)), and programmable data acceleration and offload engines. A DPU may provide the generality and the programmability of CPUs while supporting specialization to operate efficiently on networking packets, storage requests, analytics requests, or the like.

The resources of a DPU are unique and different in comparison to server resources (e.g., CPU resources) associated with the x86 family of instruction set architectures (ISA) for computer processors. For example, in some systems, tools (e.g., resource managers) may exist to manage and allocate x86 resources for applications. However, such resource managers are unable to effectively allocate resources of a DPU in comparison to allocating x86 resources. That is, for example, such resource managers are unable to allocate such resources of a DPU. Further, resources of a DPU have characteristics in that the resources can both be programmed and consumed by applications (e.g., containerized applications on a DPU, applications implemented at a server, etc.), which differs from x86 resources. As described herein, aspects of the present disclosure include techniques that support consumption and use of such DPU resources.

In some cases, an application (e.g., containerized application) may be running on an x86 host CPU (e.g., a CPU of a server hosting the DPU). To accelerate, certain resources (e.g., accelerator) are allocated/configured on the DPU. The allocation/configuration of the resources may be handled by a resource manager and support application running on the CPU of the DPU. Such aspects differ from some orchestration and application deployment models which perform the task on the local CPU when the end application is running.

Further, resources of a DPU may be shared among many entities, services, containers, and virtual machines, and problems may arise in instances in which the available resources at the DPU are limited. Further, in some systems, the usage of DPU services (HW/SW) by developed applications being deployed on the DPU is not monitored for secured access to those services. As described herein, aspects of the present disclosure include techniques that support monitoring and ensuring secured access to the services.

According to example aspects of the present disclosure, techniques described herein support effective usage of DPU resources. The DPU resources may include, for example, standard HW/SW resources (e.g., CPU processing power, RAM, etc.) and resources that are consumable by applications at the DPU and/or applications implemented at a server. The techniques described herein support mapping, allocating, and managing DPU resources for consumption on the DPU itself (e.g., mainly on the DPU). In some alternative and/or additional aspects, the techniques described herein support mapping, allocating, and managing the DPU resources for consumption by applications on the physical server CPU (e.g., on a CPU of a server hosting the DPU). Examples of the DPU resources are later described herein with reference to resources 110 of FIGS. 1A and 1B.

Aspects of the present disclosure include techniques for exposing the DPU resources to a resource manager and/or applications that are to consume the resources. For example, aspects of the present disclosure support implementing (e.g., changing) how the DPU resources are exposed based on the resource manager tool. In some example implementations, the techniques described herein support embodiments in which an application consuming DPU resources is allowed to program the DPU resources (or a portion thereof). In some other example implementations, the techniques described herein support embodiments for monitoring and/or auditing secure usage of DPU resources. The techniques described herein may be implemented using resource manager logic associated with a DPU and/or resource manager tools that are external to the DPU.

Additional and/or alternative aspects of the present disclosure further include creating a catalog of DPU core resources and services, based on which a DPU may allocate resources to an application. The application may be local to the DPU or implemented at a server separate from the DPU. The catalog may include templates for every resource or capability (e.g., setting the hardware clock, system administration operations, etc.) providable by the DPU. The catalog may support the registration by DPU application developers as DPU core resource/service owners for specific functionalities based on the templates. For example, use of the catalog may expose an easy way for DPU application developers to register as DPU core resource/service owners.

In some aspects, the DPU may support auditing and interception of requests (e.g., requests by applications for core resources/services of the DPU) using an auditing and interception engine (later illustrated at FIG. 1B). In some aspects, a DPU resource management circuit (e.g., internal or external to the DPU) may monitor audit events generated by the auditing and interception engine, and the DPU resource management circuit may discover and report usage violations of core resources/services based on the monitoring.

Particular aspects of the subject matter described herein may be implemented to realize efficient use and management of DPU resources. For example, by providing a requesting application access to resources for which the application is authorized to consume, while preventing non-authorized applications from accessing those same resources, the techniques described herein may mitigate or prevent instances in which the resources are unavailable for the requesting application. Mitigating or preventing such instances in which resources are unavailable may thereby achieve reduced processing latency, improved processing efficiency, and the like.

Aspects of the disclosure are further illustrated by and described with reference to apparatus diagrams, system diagrams, and flowcharts.

FIG. 1A illustrates an example of a system 100 that supports aspects of the present disclosure.

The system 100 may include a DPU 105. The DPU 105 may be a system on chip (SOC) device that combines flexible and programmable acceleration engines, a high-performance network interface, and a high-performance and software-programmable multi-core CPU. In some aspects, the DPU 105 may be standalone or included in another device. For example, the DPU 105 may be (or included in) a network interface card (NIC). In some aspects, the NIC may be a Smart NIC capable of supporting accelerated networking functions. A Smart NIC may also referred to herein as an intelligent server adapter (ISA).

In an example of the system 100, the DPU 105 may include a telemetry component 107, resources 110, applications 115, acceleration engines (e.g., semiconductor acceleration engine(s) 125, acceleration engine(s) 130), a network interface 135, a GPU 140, a CPU 141, programmable processing units 145 (e.g., of different types and capabilities), a PCI express (PCIe) switch 150, and memory 155. The CPU 141 may be an example of a programmable processing unit 145.

The telemetry component 107 may support automated communication processes between the DPU 105 and multiple devices and/or data sources (e.g., a server 165, DPU resource management circuits 170, databases (not illustrated), etc., aspects of which are later described herein). The telemetry component 107 may support monitoring of devices and data. In some cases, the telemetry component 107 may support monitoring of network infrastructure, storage infrastructure, and resource consumption.

The resources 110 (e.g., resources 110-*a* through resources 110-*n*, where n is an integer value) may be referred to as DPU resources. The resources 110 may be consumable by applications 115 (e.g., application 115-*a* through application 115-*n*, where n is an integer value) executable on the DPU 105. In some examples, the applications 115 may include containerized applications running on the DPU 105.

Additionally, or alternatively, the resources 110 may be consumable by applications 117 (e.g., application 117-*a* through application 117-*n*) executable on a server 165-*a*. In some examples, the applications 117 may include containerized applications running on the server 165-*a*. In some aspects, the applications 117 may be executed on a virtual machine implemented at the server 165-*a*. In some aspects, the server 165-*a* may be hosting the DPU 105, and the applications 117 running on the server 165-*a* may consume the resources 110. The server 165-*a* may communicate with the DPU 105 via a PCIE interface (e.g., PCIE switch 150 and a PCIe bus) of the DPU 105. In some alternative and/or additional implementations, aspects of the present disclosure support consumption of the resources 110 by applications 118 on a remote server (e.g., server 165-*b*).

The resources 110 of the DPU 105 may include circuitry capable of providing functions of the DPU 105. In some aspects, the resources 110 may include programmable and non-programmable (e.g., fixed function) resources. In some other aspects, one or more portions (e.g., resources 110-*a*) of the resources 110 may be programmable using another portion (e.g., resources 110-*b*) of the resources 110. In an example, the system 100 may support consumption of resources 110-*a* and resources 110-*b* by an application (e.g., application 115-*a*, application 117-*a*, etc.), in which the application may program one or more functions associated with resources 110-*a*, using the resources 110-*b*. Examples of the resources 110 are later described herein with reference to Table 1.

Accordingly, for example, the system 100 supports an orchestration platform (also referred to herein as a container orchestration platform) associated with applications 115 at the DPU 105 and/or applications 117 running on the server 165-*a* (local server) hosting the DPU 105. For example, the system 100 may support container orchestration, enabling developers to build containerized applications (e.g., applications 115, applications 117, etc.) and services. In some aspects, the applications 115 may include applications running as a virtual machine implemented at the DPU 105. In an example, container orchestration may enable the developers to scale, schedule, and monitor the containers.

The orchestration platform of the system 100 may include any orchestration platform supportive of managing containers in a network (e.g., communications network 103). The orchestration platform may include one or more clusters, in which a cluster is a collection of compute, storage, and networking resources that the orchestration platform may utilize to run workloads of the network. Each cluster can may include one or more hosts (physical servers and/or virtual machines). Each cluster may include a master node (also referred to herein as a central node, for example, central node 185 later described with reference to FIG. 1B) and multiple worker nodes. In some examples, a cluster may include multiple masters to provide high availability. The master node may manage the scheduling and deployment of applications instances (e.g., application instances) across nodes. The master node may provide a full set of services (also referred to herein as the control plane). The nodes may be implemented by any computing device (e.g., client devices (not illustrated), servers 165, etc.) of the system 100.

The acceleration engines (e.g., semiconductor acceleration engine(s) 125, acceleration engine(s) 130) may include hardware components or electronic circuitry designed to perform functions with relatively higher efficiency compared to software programs executed on the CPU 141.

The network interface 135 may support the communication (e.g., transmission, reception) of packets between the DPU 105 and other devices (e.g., a communication device, a server 165, a database (not illustrated), etc.). In some aspects, the network interface 135 may support the communication of packets between the DPU 105 and the server 165-*b* (e.g., via the cloud infrastructure(s) 160) and/or a server 165-*c* (e.g., via the communications network 103). In some aspects, the network interface 135 may be a NIC.

The GPU 140 may support processing of computationally intensive workloads (e.g., artificial intelligence, deep learning, data science, etc.). Additionally, or alternatively, The CPU 141 (and/or other programmable processing units 145) may support processing of computationally intensive workloads. In some aspects, the CPU 141 may implement aspects described herein with respect to DPU resource management. For example, aspects of the DPU resource management circuits 170 (later described herein) may be implemented by the CPU 141. Additionally, or alternatively, aspects of the DPU resource management circuits 170 may be implemented at a central node (e.g., a master node, for example, central node 185) of the system 100.

Example aspects of DPU capabilities (also referred to herein as "core services") associated with the DPU hardware resources (e.g., resources 110) are described herein. In some aspects, the DPU capabilities may include a combination of programmable and non-programmable DPU capabilities. For example, the DPU hardware resources may include a combination of programmable resources and non-programmable resources. Aspects of the present disclosure support mapping the DPU hardware resources to the catalog data structure 120.

In an example, the DPU capabilities may include DPU system core services. The DPU system core services may support functions associated with system bin integrity and system administration operations.

In another example, the DPU capabilities may include networking core services. The networking core services may support functions associated with implementations of a distributed virtual multilayer switch. For example, the networking core may support port configuration operations associated with an open vSwitch (OVS), flow configuration operations associated with OVS, and socket connection operations associated with an OVS database (OVSDB).

In some other examples, the DPU capabilities may include time core services. The time core services may support operations associated with setting a system clock associated with a system (e.g., the system 100, a system including the DPU 105, etc.). In some cases, the time core services may support operations associated with stopping or pausing the system clock when the system enters a deep sleep mode.

In some examples, the DPU capabilities may include firmware core services. The firmware core services may support operations associated with modifying firmware parameters, maintaining firmware parameter integrity, and/or maintaining firmware version integrity.

In some other examples, the DPU capabilities may include storage core services. The storage core services may support operations associated with NVMe software-defined network accelerated processing (SNAP™) for hardware-accelerated virtualization of NVMe storage. The storage core services may support operations associated with mount calls.

In some examples, the DPU capabilities may include virtio device emulation (e.g., virtio emulation service described herein).

In some examples, the DPU capabilities may include security core services. The security core services may support operations associated with keying file integrity.

The PCIe switch 150 may support switching between buses (e.g., PCIe buses) included in the DPU 105. The PCIe switch 150 may support packet based communications protocols and packet routing (e.g., based on memory address, I/O address, device ID, etc.). Additionally, or alternatively, the DPU 105 may include other switch types (e.g., PCI switches) for switching between buses included in the DPU 105.

The memory 155 may include memory local to the DPU 105. In some aspects, the memory 155 may store instructions and/or data local to the DPU 105. The memory 155 may include one or multiple computer memory devices. The memory 155 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 155, in some examples, may correspond to a computer-readable storage media. In some aspects, the memory 155 may be internal or external to the DPU 105. In some aspects, the resources 110 and/or applications 115 may be stored on the memory 155.

Components of the DPU 105 such as, for example, the telemetry component 107, resources 110, acceleration engines (e.g., semiconductor acceleration engine(s) 125, acceleration engine(s) 130), network interface 135, GPU 140, CPU 141, programmable processing units 145, PCIe switch 150, memory 155, may be interconnected by a system bus (not illustrated) of the DPU 105. The system bus may be, for example, a PCIe bus, a PCI bus, or the like. In some aspects, the system bus may include or be any high-speed system bus.

The system 100 may include a catalog data structure 120 (also referred to herein as a catalog). The catalog data structure 120 may include entries 121. One or more of the entries 121 may correspond to or be associated with one or more resources 110 (e.g., resources 110-*a*, etc.) of the DPU 105. In some examples, each of the entries 121 may correspond to one or more functions provided by the one or more resources 110.

The catalog data structure 120 may include templates 144. Each of the templates 122 may correspond to one or more resources 110 (e.g., resources 110-*a*, etc.) of the DPU 105. One or more of the templates 122 may correspond to or be associated with one or more functionalities of the DPU 105 (e.g., as provided using the one or more resources 110). Accordingly, for example, the catalog data structure 120 may include entries 121 and templates 122 that respectively map to functionalities provided by resources 110 of the DPU 105.

The catalog data structure 120 may be internal to the DPU 105. For example, the catalog data structure 120 may be implemented at the DPU 105. In some aspects, the catalog data structure 120 may be stored on memory 155. Additionally, or alternatively, the catalog data structure 120 may be external to the DPU 105. For example, the catalog data structure 120 may be stored on a database or a server 165 and coupled to the DPU 105 via communications network 103.

According to aspect of the present disclosure, using the catalog data structure 120, the system 100 may expose the resources 110 of the DPU 105 to any orchestration platform and applications thereof. An orchestration platform (and applications associated with the orchestration platform) may consume the resources 110 by referencing the catalog data structure 120. In some aspects, the system 100 may provide an interface and a pipeline (e.g., using the catalog data structure 120) via which the resources 110 are consumable by the orchestration platform, and the orchestration platform may allocate the resources 110 to an application 115 running on the DPU 105 or an application 117 running on a local server (e.g., server 165-*a*) hosting the DPU 105.

The system 100 may support management of the resources 110 of the DPU 105. For example, the system 100 may include DPU resource management circuit(s) 170 (e.g., DPU resource management circuit 170-*a*, DPU resource management circuit 170-*b*, etc.) that control access to the resources 110. In some examples, one or more DPU resource management circuits 170 may be internal to the DPU 105.

Additionally, or alternatively, one or more DPU resource management circuits 170 may be external to the DPU 105. For example, one or more DPU resource management circuits 170 may be integrated in a device that is separate from, but electrically coupled, to the DPU 105. In an example, the DPU 105 may be included in a NIC (e.g., a Smart NIC), and the NIC may further include a DPU resource management circuit 170 that is electrically coupled to the DPU 105. In another example, one or more DPU resource management circuits 170 may be implemented at a server 165 in electronic communication with the DPU 105 (e.g., server 165-*a* hosting the DPU 105).

The system 100 may include a cloud infrastructure(s) 160, also referred to herein as a digital infrastructure. In an example, the cloud infrastructure(s) 160 may be referred to as a services/applications cloud infrastructure. The cloud infrastructure(s) 160 may be implemented by any combination of servers 165 (e.g., server 165-*b*) and/or databases (not illustrated). The cloud infrastructure(s) 160 may provide cloud computing services (also referred to herein as digital services) such as infrastructure as a service (IaaS), platform as a service (Paas), software as a service (Saas), storage as a service (STaaS), security as a service (SECaaS), data as a service (Daas), desktop as a service (DaaS), test environment as a service (TEaaS), and application programming interface (API) as a service (APIaaS). In some examples, the cloud infrastructure(s) 160 may include an API server.

Aspects of the DPU 105, the catalog data structure 120, the cloud infrastructure(s) 160, and the servers 165 described herein may be implemented by any electronic devices capable of connecting to a wireless or wired network. In some cases, the system 100 may include any number of devices (e.g., DPUs 105, etc.) and/or servers 165, and each of the devices and/or servers may be associated with a respective entity.

The system 100 may support the communication of data packets between entities (e.g., DPU 105, catalog data structure 120, DPU resource management circuits 170, servers 165, etc.) of the system 100, for example, via direct communications (e.g., without communications network 103) and/or via communications network 103. Aspects of the communications network 103 may be implemented by any communications network capable of facilitating machine-to-machine communications between entities (e.g., any number of DPUs 105, servers 165, devices, etc.). For example, the communications network 103 may include any type of known communication medium or collection of communication media and may use any type of protocols to transport messages, signals, and/or data between endpoints. In some aspects, the communications network 103 may include wired communications technologies, wireless communications technologies, or any combination thereof. In some examples, the communications network 103 may support non-secure communication channels and secure communication channels.

The Internet is an example of a network (e.g., a communications network 103) supported by the system 100, and the network may constitute an Internet Protocol (IP) network consisting of multiple computers, computing networks, and other devices (e.g., DPU 105, servers 165, communications devices, etc.) located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, Ethernet, InfiniBand™, a cellular network, and any other type of packet-switched or circuit-switched network known in the art. In some cases, the system 100 may include of any combination of networks or network types. In some aspects, the networks may include any combination of communication mediums such as coaxial cable, copper cable/wire, fiber-optic cable, or antennas for communicating data (e.g., transmitting/receiving data).

According to example embodiments of the present disclosure, the DPU resource management circuit 170-*a* may establish an interface associated with managing resources 110 of the DPU 105. The DPU resource management circuit 170-*a* may establish the interface based on a DPU resource management circuit 170-*b* accessing the DPU 105. As described herein, the DPU resource management circuit 170-*a* and the DPU resource management circuit 170-*b* may control access to the resources 110 and monitor usage of the resources 110. In some aspects, the DPU resource management circuit 170-*a* may be referred to as a resource manager tool (or resource manager tools), and the DPU resource management circuit 170-*b* may be referred to as a resource manager capable of creating and assigning resources 110 to a resource consumer (e.g., an application 115, an application 117, etc.).

The DPU resource management circuit 170-*b* may register resources (e.g., resources 110-*a*, resources 110-*b*, etc.) to a scheduling entity that can discover the resources and schedule a workload if the resource exists. Additionally, or alternatively, the DPU resource management circuit 170-*b* may invoke the scheduling entity to create and/or configure resources if no resources are available. Accordingly, for example, a resource consumer may access resources (e.g., resources 110-*a*, resources 110-*b*, etc.) assigned to the resource consumer.

The DPU resource management circuit 170-*a* may generate the catalog data structure 120 described herein. For example, the catalog data structure 120 may be a catalog of resources 110 (e.g., DPU core resources, etc.) and services with templates for every functionality of the DPU 105.

The DPU resource management circuit 170-*a* may monitor usage of the resources 110 of the DPU 105. In an example, the DPU resource management circuit 170-*a* may monitor the usage based on auditing data 171 provided by the DPU resource management circuit 170-*b*. Accordingly, for example, the DPU resource management circuit 170-*a* (in combination with the DPU resource management circuit 170-*b*) may monitor and audit secure usage of the resources 110. Examples of the auditing data 171 are later described with reference to FIG. 1B.

In an example, in monitoring the usage of the resources 110, the DPU resource management circuit 170-*a* may detect usage of resources 110-*a* by an application (e.g., application 115-*a*, application 117-*a*, etc.). The DPU resource management circuit 170-*a* may determine, from the auditing data 171 provided by the DPU resource management circuit 170-*b*, whether the application has ownership of the resources 110-*a*. The auditing data 171 may include information indicating whether the usage of resources 110-*a* by the application is an authorized usage (e.g., due to ownership of the resources 110-*a* by the application) or non-authorized usage (e.g., due to non-ownership of the resources 110-*a* by the application).

In an example in which the DPU resource management circuit 170-*a* determines (e.g., from the auditing data 171) that the application does not have ownership of the resources 110-*a*, the DPU resource management circuit 170-*a* may generate reporting data 173. The reporting data 173 may include an indication (e.g., an error flag, error details, temporal information, application information, etc.) of a violation associated with the use of the resources 110-*a* by the application. In an example, the DPU resource management circuit 170-*a* may output the reporting data 173 to another device (e.g., a central node 185 of FIG. 1B).

The DPU resource management circuit 170-*a* may control usage of the resources 110-*a* in response to determining whether the application has ownership of the resources 110-*a*. In the example in which the DPU resource management circuit 170-*a* determines the application does not have ownership of the resources 110-*a*, the DPU resource management circuit 170-*a* may intercept the usage of the resources 110-*a* by the application. For example, the DPU resource management circuit 170-*a* may prevent the application from further using the resources 110-*a*.

The DPU resource management circuit 170-*b* may access the catalog data structure 120 in association with controlling access to the resources 110. For example, the DPU resource management circuit 170-*b* may receive requests from applications (e.g., applications 115, applications 117, etc.) for resources 110 of the DPU 105. The DPU resource management circuit 170-*b* may allocate any of the resources 110 (e.g., resources 110-*a*, resources 110-*b*, etc.) to an application in response to verifying a request provided by the application.

In an example implementation, application 115-*a* may transmit a request to the DPU resource management circuit 170-*b* for access to the resources 110-*a*. The request may include data indicating runtime information associated with the resources 110-*a*. In an example, the runtime information may include an indication of ownership, by the application 115-*a*, of the resources 110-*a*. In some aspects, the runtime information may include data indicating an operational state associated with the application 115-*a* and the resources 110-*a*.

The operational state may indicate whether the resources 110-*a* are dedicated or non-dedicated resources. For example, the operational state may indicate whether the resources 110-*a* are dedicated for the application 115-*a* or shared with multiple applications (e.g., multiple applications 115, multiple applications 117, etc.). In an example in which the resources 110-*a* are shared with multiple applications, the operational state may indicate that each of the applications is authorized to use the resources 110-*a*.

In some other aspects, the request may include attributes of the resources 110-*a*. For example, the attributes may include data indicating functions provided by the resources 110-*a* (e.g., capabilities of the resources 110-*a*). In some examples, the attributes may include an indication of container(s)/service(s) to use the resources 110-*a*. Examples of the attributes are later provided at Table 1.

The DPU resource management circuit 170-*b* may verify the request. For example, the DPU resource management circuit 170-*b* may verify the ownership of the resources 110-*a*. In response to verifying the request (e.g., verifying the ownership of the resources 110-*a*), the DPU resource management circuit 170-*b* may allocate the resources 110-*a* to the application 115-*a*. In an example of allocating the resources 110-*a*, the DPU resource management circuit 170-*b* may grant the application 115-*a* access to the resources 110-*a*.

In another example of allocating the resources 110-*a* to the application 115-*a*, the DPU resource management circuit 170-*a* may allow the application 115-*a* to consume the resources 110-*a*. In some cases, the DPU resource management circuit 170-*a* may allow the application 115-*a* to both program and consume the resources 110-*a*. Additionally, or alternatively, the DPU resource management circuit 170-*a* may allow the application 115-*a* to program functions associated with the resources 110-*a*, using additional resources 110 (e.g., resources 110-*b*).

In another example implementation, the DPU resource management circuit 170-*a* and DPU resource management circuit 170-*b* may deny one or more other applications 115

(e.g., application 115-*b*) access to resources 110 (e.g., resources 110-*a*) due to unauthorized usage. For example, the DPU resource management circuit 170-*a* and DPU resource management circuit 170-*b* may deny one or more other applications 115 access to resources 110 based on an invalid request or the lack of a request, aspects of which are later described with reference to FIG. 1B.

Figure 1B:
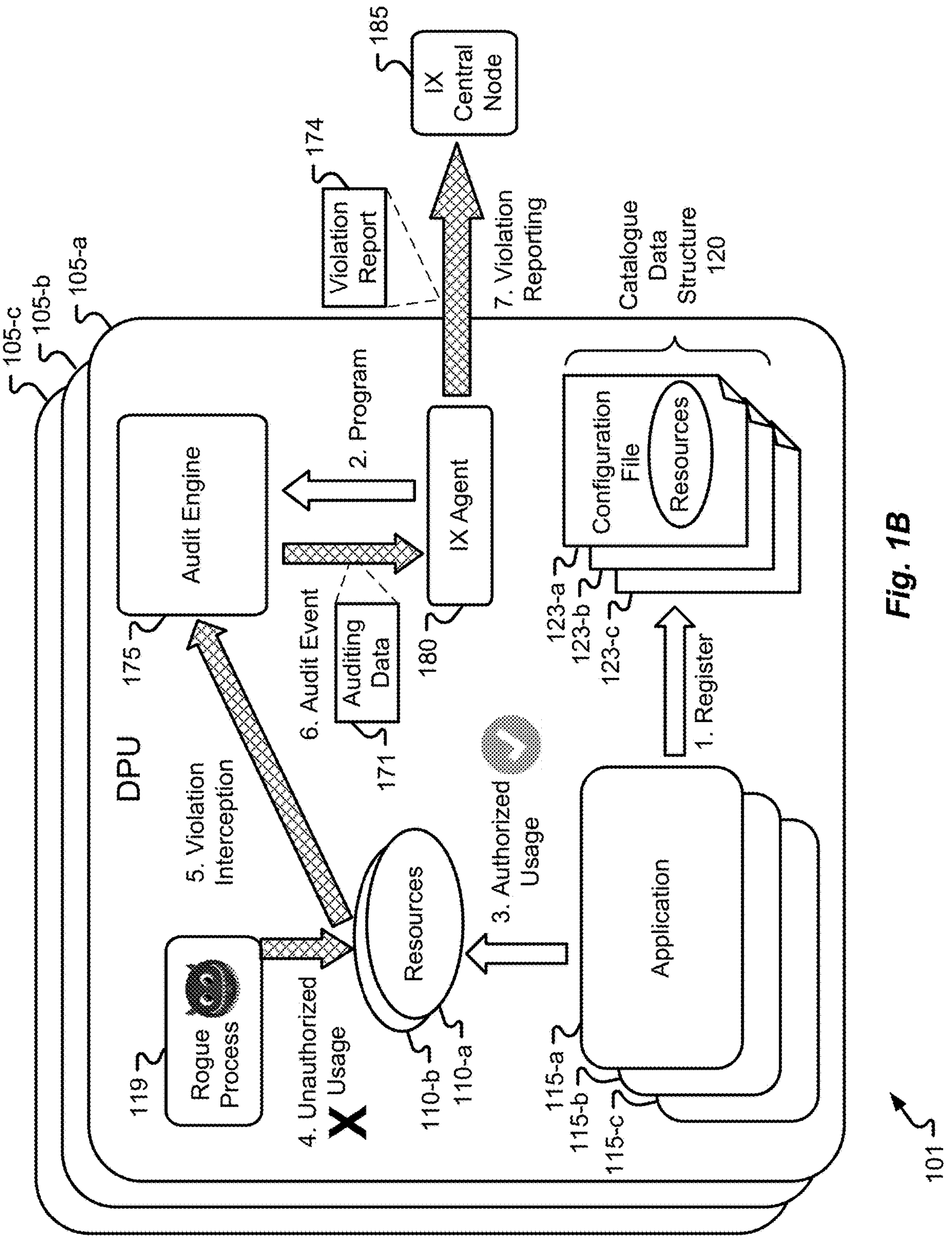

FIG. 1B illustrates an example 101 of the system 100 that supports aspects of the present disclosure.

In the example 101, the system 100 may include multiple DPUs 105 (e.g., DPU 105-*a*, DPU 105-*b*, DPU 105-*c*, etc.). The DPUs 105 may be in electronic communication with a central node 185, for example, via communications network 103 described with reference to FIG. 1.

In an example, the DPU 105-*a* may include configuration files 123 (e.g., configuration file 123-*a*, configuration file 123-*b*, configuration file 123-*c*, etc.), an audit engine 175, and an IX agent 180. The configuration files 123 may be implemented, for example, in the catalog data structure 120 of FIG. 1A. The audit engine 175 may be implemented, for example, by a DPU resource management circuit 170 (e.g., DPU resource management circuit 170-*b*) described with reference to FIG. 1A. The IX agent 180 may be implemented, for example, by a DPU resource management circuit 170 (e.g., DPU resource management circuit 170-*a*) described with reference to FIG. 1A. Although illustrated in the example 101 as being included in the DPU 105-*a*, any of the configuration files 123, the audit engine 175, and the IX agent 180 may be external to the DPU 105-*a*.

An example implementation of application registration and authorized usage is described herein with reference to FIG. 1B. A DPU application developer (e.g., via a communication device (not illustrated)) may register an application 115-*a* with the system 100 as an owner of resources 110-*a* and resources 110-*b*. The IX agent 180 (e.g., DPU resource management circuit 170-*a* of FIG. 1A) may store registration information to the configuration file 123-*a*. The registration information may include data indicating the application 115-*a* as an owner (e.g., an authorized user) of the resources 110-*a* and resources 110-*b*.

In some aspects, based on the registration information, the IX agent 180 may program the audit engine 175 to monitor usage of the resources 110. For example, the IX agent 180 may program the audit engine 175 to monitor for authorized usage and unauthorized usage (e.g., violations) of the resources 110. In an example, the IX agent 180 may provide the audit engine 175 with data indicating applications 115 that are respective authorized owners of the resources 110.

For example, based on the programming, the audit engine 175 may grant the usage of resources 110-*a* and resources 110-*b* to the application 115-*a* that is an authorized owner. In an example, based on the programming, the audit engine 175 may recognize any requests by the application 115-*a* for the resources 110-*a* and resources 110-*b* as a "registered request." The audit engine 175 may grant the usage of resources 110-*a* and resources 110-*b* to the application 115-*a*, in response to the registered request.

In some other aspects, the audit engine 175 may intercept or prevent the usage of resources 110-*a* and resources 110-*b* by an application (e.g., application 119) that is not an authorized owner. Examples of intercepting or preventing the usage of resources 110 (e.g., resources 110-*a*, resources 110-*b*, etc.) by an application deemed as not authorized are later described herein.

In an example, after registration has been completed, the application 115-*a* may transmit a request to the IX agent 180 for access to the resources 110-*a* and resources 110-*b*. The IX agent 180 may verify the ownership of the resources 110-*a* and resources 110-*b* by the application 115-*a* based on data included in the request and/or corresponding data included in configuration file 123-*a*. The data included in the request may indicate ownership of the resources 110-*a* and resources 110-*b* and may indicate functionality of the resources 110-*a* and/or resources 110-*b*.

In an example, the request may include an indication of the application 115-*a* (e.g., a requesting entity), a name associated with the functionality, and a severity associated with the functionality. Example APIs supportive of aspects of accessing applications 115 are provided below.

Example API

```
{
  "requester_name":"ovn-smartnic",
  "templates":[
    {
      "name":"ovs_add_port",
      "severity":"critical"
    },
    {
      "name":"ovs_add_flow",
      "severity":"critical"
    }
  ]
}
{
  "requester_name":"ptp-time-service",
    "templates":[
    {
    "name":"clock_set_time",
    "severity":"critical"
    }
  ],
}
```

In an example, the IX agent 180 may search the configuration files 123 for any configuration file 123 (e.g., configuration file 123-*a*) verifying the application 115-*a* as an owner of the resources 110-*a* and resources 110-*b*.

In response to verifying the request (e.g., verifying the ownership of the resources 110-*a* and resources 110-*b*), the IX agent 180 may allocate the resources 110-*a* and resources 110-*b* to the application 115-*a*. In an example, the IX agent 180 may grant the application 115-*a* access to the resources 110-*a* and resources 110-*b*. Accordingly, for example, the application 115-*a* may consume the resources 110-*a*. Additionally, or alternatively, the application 115-*a* may program functions associated with the resources 110-*b*, using the resources 110-*a*.

An example implementation of unauthorized usage is described herein with reference to FIG. 1B. In some aspects of the example implementation, the IX agent 180 and the audit engine 175 may deny one or more other applications (e.g., application 119) access to the resources 110-*a* and resources 110-*b*. For example, the IX agent 180 and the audit engine 175 may intercept or prevent the usage of resources 110-*a* and resources 110-*b* by an application (e.g., application 119) that is not an authorized owner.

The IX agent 180 (e.g., in combination with the audit engine 175) may monitor for authorized and/or unauthorized usage of the resources 110. For example, the audit engine 175 may detect for unauthorized usage of resources 110 (e.g., resources 110-*a*, resources 110-*b*, etc.) by applications not authorized to use the resources 110.

In an example, the audit engine 175 may detect usage of the resources 110-*a* by the application 119. In response to detecting the usage of the resources 110-*a*, the audit engine 175 may determine the application 119 is not authorized to use (e.g., does not have ownership of) the resources 110-*a*. In an example, the audit engine 175 may determine that the application 119 is not authorized because the application 119 did not submit a request for using the resources 110-*a*. Additionally, or alternatively, the audit engine 175 may have received a request from the application 119 for the resources, but the audit engine 175 may determine that the request is absent an indication of ownership, by the application 119, of the resources 110-*a*. In some cases, the application 119 may be registered as authorized to use other resources (e.g., resources 110-*c*) of the DPU 105, but not as authorized for resources 110-*a*.

Accordingly, for example, detecting the usage of the resources 110-*a* by the application 119 and/or determining the application 119 is not authorized may trigger an audit event at the audit engine 175. The audit engine 175 may generate auditing data 171 indicative of the audit event, indicating the unauthorized usage of the resources 110-*a* by the application 119. The audit engine 175 may transmit the auditing data 171 to the IX agent 180.

The IX agent 180 may identify, from the auditing data 171, that the application 119 does not have ownership of resources 110-*a*. Accordingly, for example, the IX agent 180 may generate a violation report 174 indicating details of the unauthorized usage of the resources 110-*a* by the application 119 (e.g., the violation). In some aspects, the IX agent 180 may provide the violation report 174 in the reporting data 173 described with reference to FIG. 1.

Additionally, or alternatively, in response to identifying (e.g., from the auditing data 171) that the application 119 does not have ownership of resources 110-*a*, the IX agent 180 may intercept the usage of the resources 110-*a* by the application 119. For example, the IX agent 180 may perform one or more operations preventing the application 119 from further accessing the resources 110-*a*. In some cases, the IX agent 180 may intercept (e.g., block) any additional system calls by the application 119 for the resources 110-*a*.

In the description of the operations described with reference to FIG. 1B, the operations may be performed in a different order than the order described, one or more of the operations may be repeated, or the operations may be performed in different orders or at different times. Certain operations may also be omitted or added.

FIG. 1C illustrates an example of the violation report 174.

It should be noted that the descriptions with respect to FIGS. 1A through 1C are example implementations supportive of a resource manager flow, methods to map DPU resources and feed the resources manager, and methods to monitor and enforce access to those resources.

Further examples of DPU resource management are described herein.

1. Example Overview

Aspects of the system 100 described herein may support DPU resource management for managing resources (e.g., resources 110, DPU capabilities, etc.) of a DPU 105 as shared by services, containers, and virtual machines (VMs).

The DPU resource management may support exposing only needed and assigned resources (e.g., resources 110) to a specific container (e.g., a containerized application, for example, an application 115 or application 117). In some aspects, a containerized application may be a virtual machine implemented at the DPU 105. DPU resource management described herein may provide predictable quality of service (QoS) associated with resources and avoid denial-of-service (DoS) of resources to authorized owners, which may provide prevent starvation due to lack of available resources. The system 100 may provide requested resources (e.g., needed resources) to an executing workload with a highest level of automation, which may thereby provide efficient (e.g., simplified) and rapid application deployment.

2. DPU Resources

The resources 110 described herein include DPU resources. For example, the resources 110 may include different types of low level DPU resources: DPU resources shared with multiple applications (e.g., applications 115, applications 117, etc.) and DPU resources that are dedicated per application.

Example aspects of the resources 110 are provided in Table 1 below. The example implementations provided in Table 1 support techniques for mapping DPU resources in order to expose resources to a known resource manager (e.g., Kubernetes (also referred to herein as K8s)). The example implementations support how DPU resources may be mapped, and further, how the DPU resources may be provided to different resource managers (e.g., two different resource managers).

The example implementations support how the resource managers may monitor resource usage. The example implementations support limiting the DPU resources (e.g., limiting access to the DPU resources, limiting the amount of available DPU resources, etc.) and/or allocating requested DPU resources. In some aspects, the example implementations support managing and monitoring resources that are on a DPU and/or a host server. For example, some resources described in Table 1 may be on a DPU (e.g., DPU 105 of FIG. 1) or a host server (e.g., server 165-*a* of FIG. 1).

In reference to Table 1, aspects of the present disclosure support using the Kubernetes CRD mechanism to describe and create a resource catalog of DPU resources (e.g., catalog data structure 120 associated with resources 110 of FIG. 1) to be consumed by Kubernetes applications running on the DPU itself and/or Kubernetes applications running on a server CPU.

TABLE 1

| # | Resource/ Capability/ access control list (ACL) | Container or K8s resource setting | Control method/ Kernel object | Container/Service to use the resource | Shared or per Pod resource? |
|---|---|---|---|---|---|
| 1 | DPU CPU cycles | resources: limits | cpu cgroup | nvme/virtio block/fs emulation service Any service | shared |
| 2 | Guaranteed DPU CPU cores | resources: limits | cpuset cgroup | TBD | dedicated |
| 3 | DPU memory | resources: limits | memory cgroup | Any service (need to define memory limits for the service) | Shared or dedicated |

TABLE 1-continued

| # | Resource/ Capability/ access control list (ACL) | Container or K8s resource setting | Control method/ Kernel object | Container/Service to use the resource | Shared or per Pod resource? |
|---|---|---|---|---|---|
| 4 | DPU huge pages memory | resources: hugepages-<type> | Memory cgroup | Virtio blk/nvme emulation service that relies on SPDK/DPDK or other similar that relies on huge pages support | dedicated |
| 4 | Network administrative capability to CRUD network devices | capabilities | CAP_NET_ADMIN process capability | virtio net emulation service SF provisioning service | Not applicable |
| 5 | Network raw device access | capabilities | CAP_NET_RAW process capability | nvme/virtio block/fs emulation service virtio net emulation service ovs dpdk | Not applicable |
| 6 | Memory pinning for RDMA devices | capabilities | CAP_IPC_LOCK process capability | nvme/virtio block/fs emulation service virtio net emulation service | Not applicable |
| 7 | Physical Function (PF) RDMA device | CRD resource Host network namespace | Rdma device using device plugin | nvme/virtio block/fs emulation service virtio net emulation service Host introspection service ovs dpdk service Intrusion detection service | Shared by infrastructure Pods |
| 8 | PF Eswitch representor netdevices | Not applicable Host network namespace | Not applicable (available only in host net namespace) | nvme/virtio block/fs emulation service virtio net emulation service ovs dpdk service | Shared by infrastructure Pods |
| 9 | SF netdevice | CRD resource Network namespace device | Using device cgroup and net namespace Device and CNI plugin unavailable | nvme/virtio block/fs emulation service virtio net emulation service Intrusion detection service HBN service SFC service function chaining service | Per Pod |
| 10 | SF RDMA device | CRD resource Network namespace device | device and CNI plugin unavailable Will use device cgroup and net namespace | nvme/virtio block/fs emulation service virtio net emulation service Host introspection service Intrusion detection service HBN service SFC service function chaining service | Shared by infrastructure Pods |
| 11 | SF vdpa device to run VM inside the DPU | CRD resource Network namespace device | Using device cgroup and net namespace Device and CNI plugin unavailable | VM appliance class of applications such as firewall | Per kubevirt Pod |
| 12 | DPA CPUs | CRD resource | Using resource manager APIs | nvme/virtio block/fs emulation service virtio net emulation service Connection tracking offloads VM RDMO application offloads | Yet to define |
| 13 | DPA memory | CRD resource | Using resource manager APIs | nvme/virtio block/fs emulation service virtio net emulation service Connection tracking offloads VM RDMO application offloads | Yet to define |

TABLE 1-continued

| # | Resource/ Capability/ access control list (ACL) | Container or K8s resource setting | Control method/ Kernel object | Container/Service to use the resource | Shared or per Pod resource? |
|---|---|---|---|---|---|
| 14 | Locally attached SSD/nvme/ persistent memory devices | CRD resource TBD: ADD k8s link to blk iops | Device cgroup and mount namespace IO limit is through blk cgroup | nvme/virtio block/fs emulation service virtio fs emulation service | Per Kubevirt Pod |
| 15 | Persistent storage file system | Persistent storage volume | Mount namespace | nvme/virtio block/fs emulation service virtio net emulation service virtio fs emulation service | Per Pod |
| 16 | Regex accelerator | PF RDMA device Host network namespace | Device cgroup and mount namespace | Various services | Shared by infrastructure Pods Enabled by default, no special configuration needed |
| 17 | General accelerators such as Compression/ decompression, DMA, erasure coding, SHA | RDMA device (either SF/VF/PF) | Device cgroup and mount namespace Enabled/disabled using resource manager APIs | Various services | Can be shared by infrastructure Pods or can be Per Pod |
| 18 | Device memory (ICMC) | None | | | |
| 19 | SRIOV VFs | VFIO device | Using kernel interface, cgroup interface | | |

Aspects of the example DPU resources of Table 1 are provided below.

1. Eswitch Port Representor Netdevice (e.g., Resource 8 in Table 1)

Number of channels: Number of channels set default by BFB scripts. May be modified by the user to gain more system performance (memory reduction), such as when using OVS DPDK, instead of kernel OVS.

Carrier state: Depending on the network topology needs, the user should set according to uplink/lag netdevice state (follow) or force it to be up/down.

2. Function QoS

A maximum and shared rate of a PF/SF/VF/virtio net emulated device to be set up. For a group of functions, a similar rate to be set up. Available in some systems using the devlink/mlxdevm tool and using tc flower on representor net device.

3. Rdma Devices of the PF (Resource 7 of Table 1)

One or more infrastructure applications needs to access the RDMA device of the PF. Each such application should be running in the host network namespace. The RDMA subsystem is running in shared mode. It should be running in exclusive mode.

Ownership: DPU management software (e.g., DPU resource management circuit 170) may set ownership at boot up time.

4. SFs Consumed on DPU

Multiple infrastructure services may include SFs to operate. SFs based on use case range from 1 to 500+. Need a single SF allocator service that can service multiple applications.

SFs for RoCE applications: Created by a startup script.

SFs for non emulation related infrastructure applications: Created by each such application.

SFs for net emulation service: Created by monolithic net controller application. Need to split to another child service that can implement a rapid rate.

SF configuration/attributes: Trust state, Number of EQs and EQ depth, Netdevice enable/disable, RDMA enable/disable, Vdpa enable/disable, and Number of flow counters per SF. May be decided by the user application. May be implemented using central service with APIs.

5. ARM CPUs

6. DPU RAM

7. DPA Subsystem

DPA HARTs (e.g., processing threads/hardware threads): Dedicated DPA HARTs to a VM or infrastructure application.

DPA memory: Upper threshold on the memory

8. Unknowns

3. Container Resources

Examples of resources to be assigned/allocated when starting a container are described herein. In some example implementations, one or more of the example resources may be omitted (e.g., based on use case). For example, depending on use case, resources associated with the use case may be assigned when starting a container.

Resource to Assign when Starting Container

- Upper limit on memory usage using memory cgroup
- Devlink device using net namespace.
- Rdma device using net namespace and device cgroup
- Linux process capabilities in context of rdma device: CAP_NET_RAW, CAP_NET_ADMIN, CAP_IPC_LOCK
- Net device using net namespace
- CPU bitmap and amount of CPU using cpuset and cpu cgroup Resource to Allocate/Config when Starting a Container

- SF representor
- SF with variety of attributes
- Persistence storage mount point 4. DPU Workload DPU workload may be categorized into the following example types. Each of these workloads can be running as one or more system services or containers or pod (e.g., as a lightweight VM), or as a VM. The terms "DPU workload" and "application" (e.g., application 115) may be used interchangeably herein.

Infrastructure Workloads/Applications

Infrastructure applications implement needed functionality to service workload of host or guest. Infrastructure applications can also be implemented to service other infrastructure applications to create a chain of services to avoid monolithic implementation of single application.

Infrastructure applications may often run at higher privileges (e.g., higher priorities) compared to other workloads, as infrastructure applications may involve interacting with kernel resources at a whole DPU level.

Infrastructure applications may also share devices with other peer infrastructure applications, for example, because a given device may be a multipurpose device. For example, a PCI function is an eswitch manager, a subfunction resource manager, and also an emulation manager.

Some examples of infrastructure applications supported by aspects of the present disclosure include:

- OVS and its associated services operating on eswitch manager PF;
- OVS running as DPDK application over RDMA devices of the eswitch manager;
- Virtio block, virtio fs and nvme emulation application using emulation manager PF and fewer SFs;
- Virtio net emulation application using emulation manager PF and several hundreds of SFs, and SFs representors, DPA CPUs and DPA memory;
- Host introspection application using emulated devices and resource manager PF;
- Intrusion detection application; and
- Traffic processing service using regular expression accelerator using PCI PF.

DPU Management Workloads/Applications

Includes provisioning and orchestration applications which deploy the DPU for a specific customer use case. Such applications may often configure firmware, device and involve one or multiple reboots of the host and/or DPU. Often a DPU management workload may be attributed as DPU management service.

Guest VM Offload/Acceleration

A guest VM or bare metal OS running may commonly be referred to as guest VM which, in some cases, may be considered an untrusted software.

To gain efficiency of the CPU of a guest VM, aspects of the present disclosure include offloading/accelerating the workload of the guest VM by using a DPU including a DPA subsystem.

HPC Tenant

A single tenant application that is running a server that has complete resource ownership of the server and the DPU of the server, but does not have direct access to the DPU resources.

In an example, an HPC cloud is built and a server containing DPU is given to a tenant. An HPC application wants to utilize DPA cores to accelerate complex RDMA operation. The application may be provided using a virtualized network HCA, so as not to have direct access to a multi-tenant network (e.g., the multi-tenant network may only be accessible from the DPU HCA).

As has been described herein with reference to the system 100 of FIGS. 1A and 1B, aspects of the present disclosure support techniques for: creating a catalog (e.g., catalog data structure 120) of DPU core resources and services with templates for every functionality, exposing an easy way for DPU application developers to register as DPU core resource/service owner for specific functionality based on the templates, programming a generic auditing and interception engine (e.g., audit engine 175) according to the registered requests, and monitoring the audit events generated by the engine to discover and report a core resource/service usage violation.

In contrast to some other systems supportive of various types of software security engines (e.g., SElinux is an example for security SW engine that can intercept inode calls (tempering with files), Auditd is an example for security SW engine that can intercept system calls) aspects of the present disclosure support techniques for mapping DPU resources into a catalog (e.g., catalog data structure 120), in which the DPU resources are unique to the DPU) and mapping the catalog to security engine operations. The techniques described herein may provide users a relatively easy way to consume the DPU resources (e.g., through an API capable of managing the programing of the security engine based on required resources. The techniques may support processing the logs generated by the security engine and determining (e.g., from processing the logs) instances of any requested-DPU-resource-violations. For example, the security engine may generate the logs without determining whether instances of any requested-DPU-resource-violations have occurred (e.g., the engine cannot determine instances of violations by itself).

Figure 2:
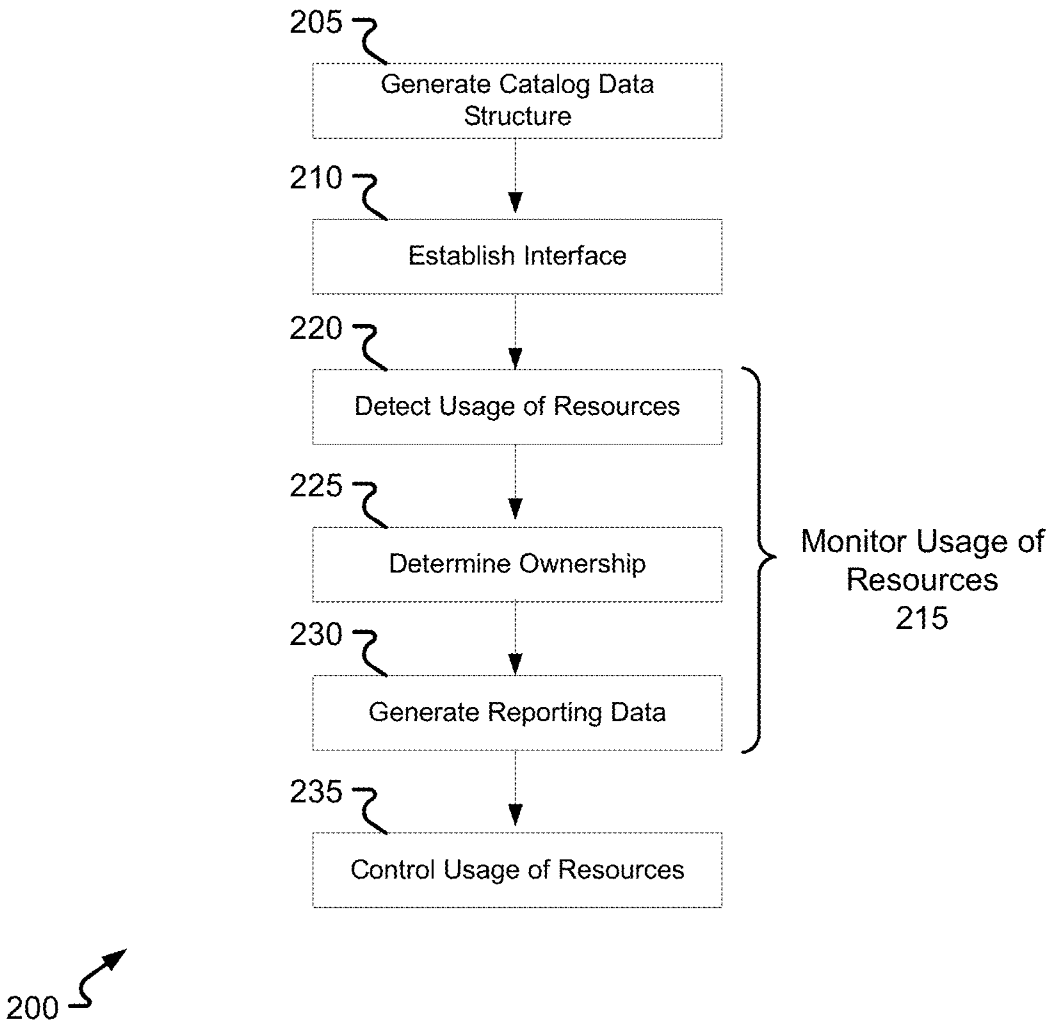
FIG. 2 illustrates an example of a process flow in accordance with aspects of the present disclosure.

FIG. 2 illustrates an example of a process flow 200 that supports consuming DPU core services and resources in an abstracted and controlled manner that allows discovery and reporting of unauthorized access to a DPU OS and applications, in accordance with aspects of the present disclosure. The process flow 200 supports definition, consumption, and controlled access of DPU resources and services.

In the following description of the process flow process flow 200, the operations may be performed in a different order than the order shown, or the operations may be performed in different orders or at different times. Certain operations may also be left out of the process flow process flow 200, or other operations may be added to the process flow 200.

It is to be understood that while one or more DPU resource management circuits 170 of a system (e.g., DPU resource management circuit 170-*a* and/or DPU resource management circuit 170-*b* of system 100) described herein may perform a number of the operations of process flow 200, any device (e.g., another device, a server 165, etc.) may perform the operations shown.

According to example aspects of the present disclosure, the system may include an orchestration platform associated with one or more applications. The one or more applications may include one or more containerized applications.

At 205, the process flow 200 may include generating (e.g., by a first DPU resource management circuit) a catalog data structure of the resources of the DPU. In some aspects, the catalog data structure includes a set of entries, and each entry in the set of the entries corresponds to at least one of: respective resources of the DPU; and one or more functions provided by the respective resources of the DPU. In some aspects, the catalog data structure includes one or more templates. In some examples, each of the one or more templates corresponds to one or more resources of the DPU and one or more functionalities of the DPU.

At 210, the process flow 200 may include establishing (e.g., by a first DPU resource management circuit) an interface associated with managing resources of a DPU, wherein establishing the interface is based on a second DPU resource management circuit of the system accessing the DPU.

In some aspects, the resources of the DPU are consumable by at least one of: one or more applications executable on the DPU; and one or more applications executable on a server.

In some aspects, at least one of the first DPU resource management circuit and the second DPU resource management circuit are external to the DPU.

At 215, the process flow 200 may include monitoring (e.g., by the first DPU resource management circuit) usage of the resources of the DPU based on auditing data provided by the second DPU resource management circuit.

In some aspects, the first DPU resource management circuit monitors usage of the resources of the DPU by: detecting (at 220) usage of one or more resources of the DPU by an application; and determining (at 225) whether the application has ownership of the one or more resources of the DPU.

In some additional and/or alternative aspects, the first DPU resource management circuit monitors usage of the resources of the DPU by: allocating or assigning one or more resources of the DPU to an application (e.g., a DPU application). In an example, the first DPU resource management circuit may assign the one or more resources to the application at a startup phase of the application.

In some aspects, the first DPU resource management circuit monitors the usage of the resources of the DPU by: generating (at 230) reporting data in response to determining, from the auditing data, the application does not have the ownership of the one or more resources of the DPU. In an example, the reporting data indicates a violation associated with the usage of the one or more resources of the DPU by the application.

At 235, the process flow 200 may include controlling (e.g., by the first DPU resource management circuit) usage of the resources of the DPU by: intercepting the usage of the one or more resources of the DPU by the application, in response to determining the application does not have the ownership of the one or more resources of the DPU.

Figure 3:
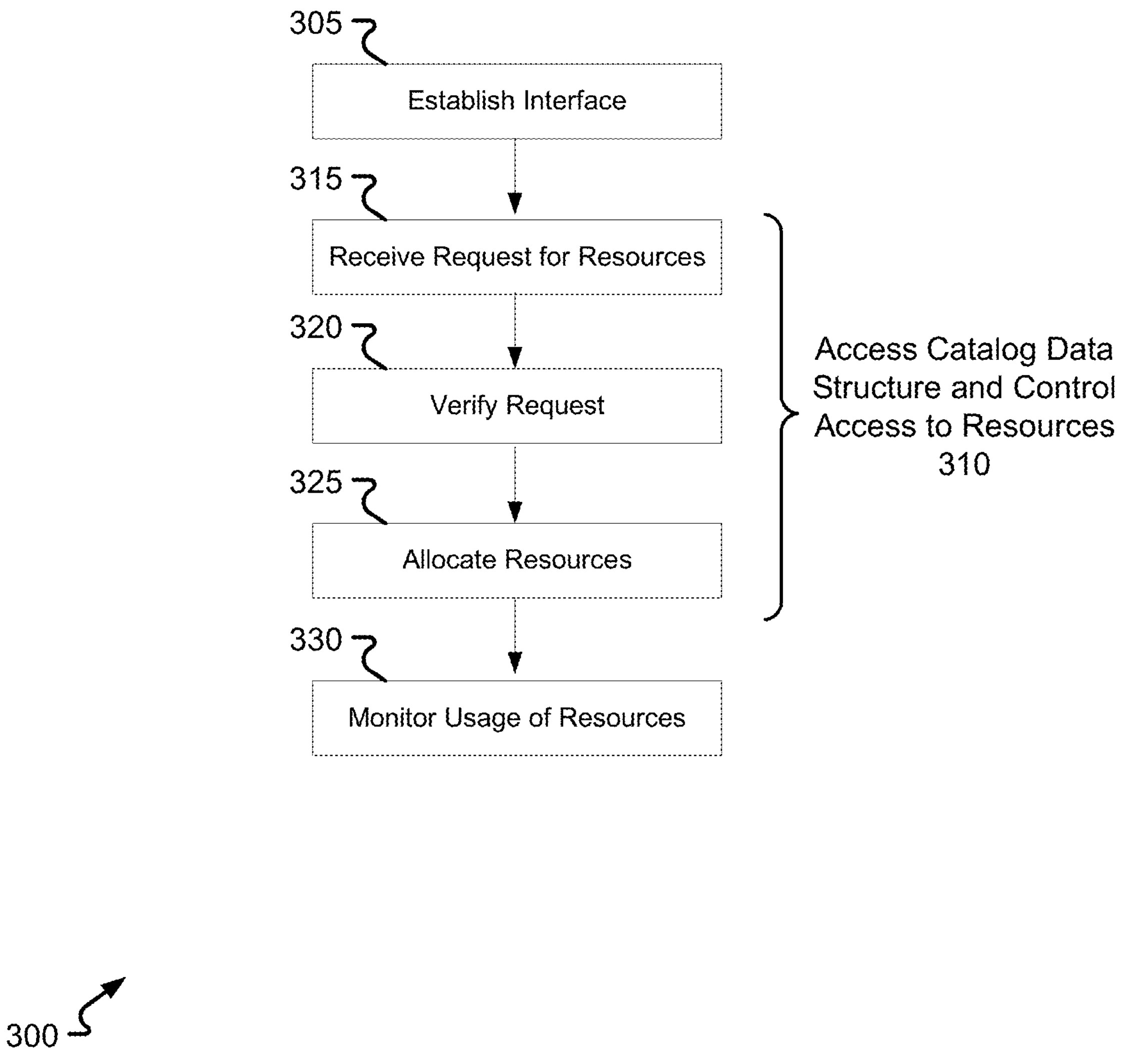
FIG. 3 illustrates an example of a process flow in accordance with aspects of the present disclosure.

FIG. 3 illustrates an example of a process flow 300 that supports consuming DPU core services and resources in an abstracted and controlled manner that allows discovery and reporting of unauthorized access to a DPU OS and applications, in accordance with aspects of the present disclosure. The process flow 300 supports definition, consumption, and controlled access of DPU resources and services.

In the following description of the process flow process flow 300, the operations may be performed in a different order than the order shown, or the operations may be performed in different orders or at different times. Certain operations may also be left out of the process flow process flow 300, or other operations may be added to the process flow 300.

It is to be understood that while one or more DPU resource management circuits 170 of a system described herein may perform a number of the operations of process flow 300, any device (e.g., another device, a server 165, etc.) may perform the operations shown.

At 305, the process flow 300 may include establishing (e.g., by a first DPU resource management circuit) an interface associated with managing resources of a DPU, wherein establishing the interface is based on a second DPU resource management circuit of the system accessing the DPU.

At 310, the process flow 300 may include accessing (e.g., by the second DPU resource management circuit) a catalog data structure of the resources of the DPU and controlling access to the resources.

For example, at 315, the process flow 300 may include receiving, at the second DPU resource management circuit, a request for the resources of the DPU. The request may be a resource allocation request.

In some examples, the request includes data indicating: runtime information associated with the resources of the DPU; and one or more attributes of the resources of the DPU. In some aspects, the runtime information includes: an indication of ownership, by the application, of the resources of the DPU; and an operational state associated with the application and the resources of the DPU. In some aspects, the one or more attributes include one or more functions provided by the resources of the DPU. In some examples, the system may include a data structure including the runtime information associated with the resources of the DPU. The runtime information may include: runtime resource usage associated with the resources of the DPU; and assignment information corresponding to the resources and the application.

At 320, the process flow 300 may include verifying the request.

At 325, the process flow 300 may include allocating, by the second DPU resource management circuit, the resources of the DPU to an application in response to verifying the request. In some aspects, the request may be received from the application. In some other aspects, the request may be received from an application of the DPU to which the resources are not to be allocated. For example, the request may be received from an operational application of the DPU (e.g., some other DPU operational software application) that is different from the application to which the requested resources are to be allocated.

In some aspects, allocating the resources to the application includes allowing the application to at least one of: consume a first portion of the resources of the DPU; and program one or more functions associated with a second portion of the resources of the DPU using the first portion of the resources of the DPU.

In some aspects, the allocation may be dynamically implemented at runtime. For example, the process flow 300 may include dynamically allocating, creating, and/or programming one or more resources at runtime to fulfill the resources associated with the request (e.g., to fulfill the resource needs of the application).

At 330, the process flow 200 may include monitoring (e.g., by the first DPU resource management circuit) usage of the resources of the DPU based on auditing data provided by the second DPU resource management circuit.

Any of the steps, functions, and operations discussed herein can be performed continuously and automatically.

The exemplary apparatuses, systems, and methods of this disclosure have been described in relation to examples of a DPU 105 and a server 165 (e.g., server 165-*a*). However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

In at least one example, architecture and/or functionality of various previous figures are implemented in context of a general computer system, a circuit board system, a game console system dedicated for entertainment purposes, an application-specific system, and more. In at least one example, computer system 700 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a data processing unit ("DPU") and a graphics processing unit ("GPU") execute other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU, a DPU, or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:

a Data Processing Unit (DPU) comprising one or more circuits that process packets within a communications network; and a first DPU resource management circuit comprising:

a processor;

memory in electronic communication with the processor; and instructions stored in the memory, the instructions being executable by the processor to:

establish an interface for managing resources of the DPU that are available for use by applications of an attached device;

expose, via the interface to at least one DPU application developer, a catalog data structure which lists all resources of the DPU in a set of entries, each entry matching a respective resource of the DPU to at least one function provided by the respective resource of the DPU;

generate and store registration information to reflect input from the at least one DPU application developer which registers at least one application as an owner of at least one of the resources of the DPU;

program a second DPU resource management circuit to generate auditing data based on the registration information;

monitor usage of the resources of the DPU based on the auditing data generated by the second DPU resource management circuit, the auditing data indicating whether a particular application is authorized or not authorized to use a requested subset of the resources of the DPU; and receive and implement instructions from an authorized application to program one or more functions of the requested subset of resources of the DPU.

2. The system of claim 1, wherein the instructions are further executable by the processor to:

generate the catalog data structure of the resources of the DPU.

3. The system of claim 2, wherein:

the catalog data structure comprises one or more templates.

4. The system of claim 1, wherein the first DPU resource management circuit monitors usage of the resources of the DPU by:

detecting usage of one or more resources of the DPU by an application; and determining whether the application has ownership of the one or more resources of the DPU based on the auditing data.

5. The system of claim 4, wherein the first DPU resource management circuit monitors the usage of the resources of the DPU by:

generating reporting data in response to determining, from the auditing data, the application does not have the ownership of the one or more resources of the DPU, wherein the reporting data indicates a violation associated with the usage of the one or more resources of the DPU by the application.

6. The system of claim 4, wherein the first DPU resource management circuit controls usage of the resources of the DPU by:

intercepting the usage of the one or more resources of the DPU by the application in response to determining the application does not have the ownership of the one or more resources of the DPU.

7. The system of claim 1, wherein the second DPU resource management circuit controls access to the resources of the DPU by:

receiving a request for the resources of the DPU; and allocating the resources of the DPU to an application in response to verifying the request.

8. The system of claim 7, wherein allocating the resources to the application comprises allowing the application to at least one of:

consume a first portion of the resources of the DPU.

9. The system of claim 7, wherein the request comprises data indicating:

runtime information associated with the resources of the DPU; and functions provided by the resources of the DPU.

10. The system of claim 9, wherein:

the runtime information comprises:

an indication of ownership, by the application, of the resources of the DPU; and an operational state associated with the application and the resources of the DPU.

11. The system of claim 7, further comprising a data structure comprising runtime information associated with the resources of the DPU, wherein the runtime information comprises:

runtime resource usage associated with the resources of the DPU; and assignment information corresponding to the resources of the DPU and the application.

12. The system of claim 1, further comprising an orchestration platform associated with the applications, wherein the applications comprise one or more containerized applications.

13. The system of claim 1, wherein the applications comprise at least one of:

one or more applications executable on the DPU; and one or more applications executable on a server.

14. The system of claim 1, wherein at least one of the first DPU resource management circuit and the second DPU resource management circuit are external to the DPU.

15. An apparatus comprising one or more circuits, wherein the one or more circuits are to:

establish an interface for managing resources of a data processing unit (DPU) that are available for use by applications of an attached device;

expose, via the interface to at least one DPU application developer, a catalog data structure which lists all resources of the DPU in a set of entries, each entry matching a respective resource of the DPU to at least one function provided by the respective resource of the DPU;

generate and store registration information to reflect input from the at least one DPU application developer which registers at least one application as an owner of at least one of the resources of the DPU;

program a DPU resource management circuit to generate auditing data based on the registration information;

monitor usage of the resources of the DPU based on the auditing data generated by the DPU resource management circuit, the auditing data indicating whether a particular application is authorized or not authorized to use a requested subset of the resources of the DPU; and receive and implement instructions from an authorized application to program one or more functions of the requested subset of resources of the DPU.

16. The apparatus of claim 15, wherein the one or more circuits are to generate the catalog data structure of the resources of the DPU.

17. The apparatus of claim 16, wherein:

the catalog data structure comprises one or more templates.

18. The apparatus of claim 15, wherein the one or more circuits are to monitor usage of the resources of the DPU by:

detecting usage of one or more resources of the DPU by an application; and determining whether the application has ownership of the one or more resources of the DPU based on the auditing data.

19. The apparatus of claim 18, wherein the one or more circuits are to monitor the usage of the resources of the DPU by:

generating reporting data in response to determining, from the auditing data, the application does not have the ownership of the one or more resources of the DPU, wherein the reporting data indicates a violation associated with the usage of the one or more resources of the DPU by the application.

20. A data processing unit (DPU) comprising:

resources that are allocatable to one or more applications; and one or more circuits to:

establish an interface for managing the resources for use by the one or more applications;

expose, via the interface to at least one DPU application developer, a catalog data structure which lists all resources of the DPU in a set of entries, each entry matching a respective resource of the DPU to at least one function provided by the respective resource of the DPU;

generate and store registration information to reflect input from the at least one DPU application developer which registers the one or more applications as an owner of at least one of the resources of the DPU;

program a DPU resource management circuit to generate auditing data based on the registration information;

monitor usage of the resources based on the auditing data generated by the DPU resource management circuit, the auditing data indicating whether a particular application is authorized or not authorized to use a requested subset of the resources; and receive and implement instructions from an authorized application to program one or more functions of the requested subset of resources of the DPU.

* * * * *